United States Patent [19]

Hansen

[11] Patent Number: 4,866,931
[45] Date of Patent: Sep. 19, 1989

[54] EXHAUST ARRANGEMENT FOR AN INTERNAL COMBUSTION ENGINE

[76] Inventor: Patrick G. Hansen, Unit 1, Mill Rd., Portslade, Sussex, England, BN4 1PD

[21] Appl. No.: 148,450

[22] Filed: Jan. 26, 1988

[30] Foreign Application Priority Data

Aug. 25, 1987 [GB] United Kingdom ............... 8719983

[51] Int. Cl.⁴ ............................................. F02B 27/02
[52] U.S. Cl. ........................................ 60/274; 60/313
[58] Field of Search ................. 60/312, 313, 324, 274

[56] References Cited

FOREIGN PATENT DOCUMENTS 645250 10/1927 France .
449115 6/1934 United Kingdom .
440955 6/1935 United Kingdom .
581216 6/1944 United Kingdom .
1357509 10/1972 United Kingdom .
1421137 12/1972 United Kingdom .
2093524 2/1982 United Kingdom .

Primary Examiner—Douglas Hart
Attorney, Agent, or Firm—Richard C. Woodbridge

[57] ABSTRACT

An exhaust system of an internal combustion engine comprises for each outlet port of each cylinder a primary and a secondary exhaust pipe, which latter are connected at their opposite end in a junction box with the primary exhaust pipe of a succeeding cylinder in the firing order so that negative pressure is created in the second exhaust pipe and evacuation of exhaust gases from the succeeding cylinder in the firing order is enhanced.

6 Claims, 3 Drawing Sheets

'Assumed' shape of exhaust port pressure curve

EXHAUST ARRANGEMENT FOR AN INTERNAL COMBUSTION ENGINE

The invention relates to modifications to conventional arrangements of exhaust systems for four-stroke internal combustion engines, but not necessarily exclusively, as used in vehicles aimed at enhancing engine performance by making use of energy which exists in the exhaust gases.

It is well known that engine output may be increased by the use of a tuned length of pipe fitted to each cylinder of a multi-cylinder engine. These have been applied to both inlet and exhaust systems either singly or simultaneously. Dependent on the length chosen for the pipes it is possible to increase the engine output at and about one speed in particular, usually towards the top end of the engine speed range. Alternatively a more modest increase in performance can be obtained by selecting or "tuning" the pipe length(s) over a much wider speed range.

It is an object of the invention to provide a modification to an orthodox, untuned, exhaust manifolding arrangement for multi-cylinder engines with a view to improving engine performance without the use of tuning pipes as normally understood.

Accordingly, the invention provides an exhaust system comprising a primary exhaust pipe adapted to be connected to the outlet or exhaust port in a cylinder head for each engine cylinder and a secondary exhaust pipe connected between a primary exhaust pipe of a first cylinder and the primary exhaust pipe of a second cylinder, the arrangement being that gas leaving the first cylinder has an influence on the gases at the exhaust port of the second cylinder during the exhaust stroke of the second cylinder.

It is desirable that the secondary exhaust pipe from one cylinder may join the primary exhaust of the next cylinder in the firing sequence used.

It is preferred that the multi-cylinder engine used should be of the four-stroke type but the use of a two-stroke engine is not precluded.

The invention extends to an internal combustion engine in combination with an exhaust system as hereinbefore defined.

By way of example descriptions of the application of the invention to a four-stroke four cylinder internal combustion engine are given with reference to the accompanying drawings.

Figure 1:
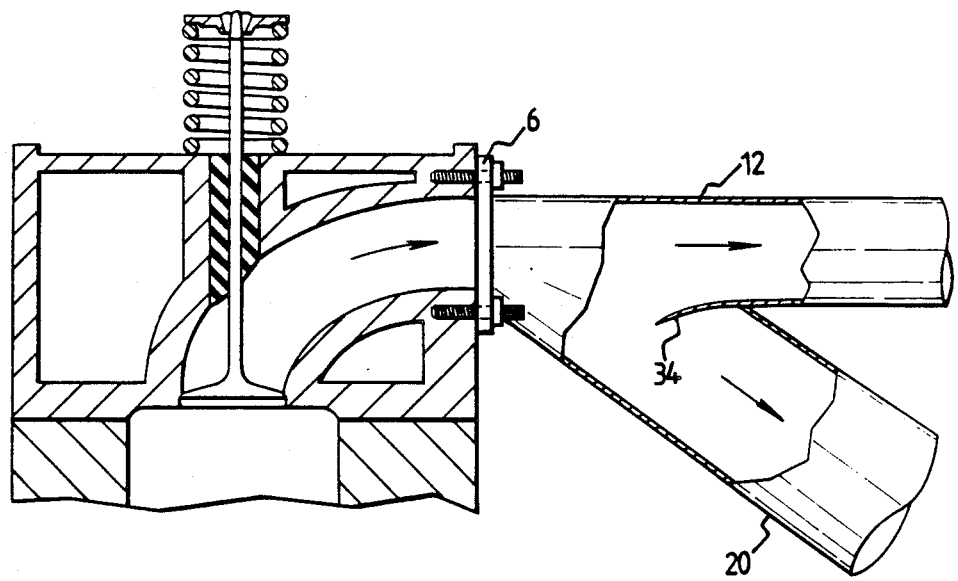
FIG. 1 is a part section through an exhaust port of one cylinder of a multi-cylinder engine to which the the invention is applied.

Referring to the drawings, FIG. 1 shows a section through a typical exhaust track in a cylinder head of a multi-cylinder engine to which the invention is applied. Such a cylinder head, which also contains on or more inlet gas ports and valves, not shown, encloses the top of the engine cylinder block in the cylinders of which pistons operate to carry out the working events of a four-stroke engine and convert the gas work during the expansion stroke part of the cycle into output torque and power via connecting rods and the crankshaft. The exhaust valve(s) is operated by means of a camshaft, as is the inlet valve(s), not shown, to open and close at predetermined regular timings in relationship to the crankshaft and piston movement during each working cycle.

The timing intervals between sequential cylinders are determined by the number of cylinders, the crankshaft arrangement and the firing orders chosen for a particular engine.

Each exhaust track, or port, has an exhaust pipe attached at its exit from the cylinder head face (6) usually by a bolted flange.

Figure 2:
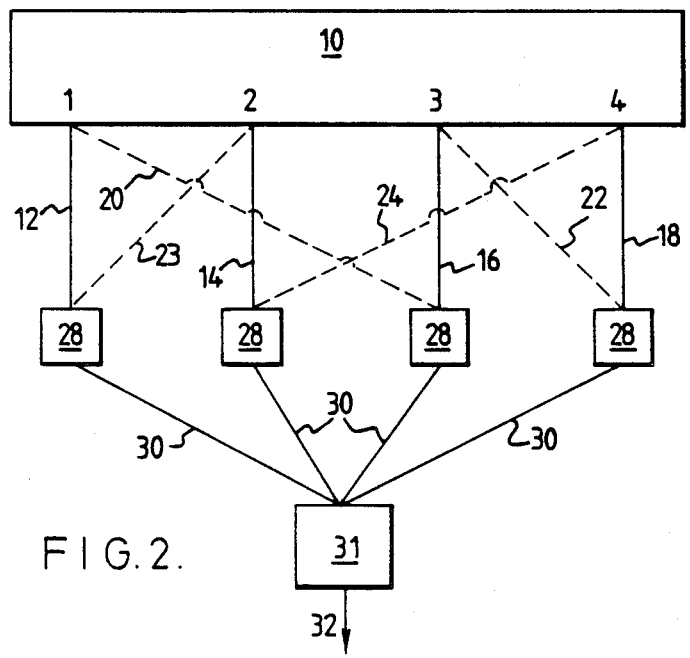
FIG. 2 is a diagrammatic arrangement of an exhaust system of a multi-cylinder according to the invention for one of the possible firing orders.

FIG. 2 shows diagrammatically an arrangement of exhaust pipes according to the invention for an engine working on the four-stroke cycle having four cylinders and having the firing orders 1-2-4-3-1. Here the engine 10 has primary exhaust pipes 12, 14, 16 and 18 connected respectively to the exhaust port of each cylinder with secondary exhaust pipes shown dotted 20, 22, 24 and 26 connected respectively to the primary exhaust pipe of the previous cylinder in the firing sequence of the engine 10. With the chosen firing order for this engine pipes 12 and 20, 14 and 22, 16 and 26, and 18 and 24 are connected in pairs.

The ends of the primary and secondary exhaust pipes remote from the cylinder head are connected in their respective pairs in junction boxes 28 the downstream sides of which are connected by further separated pipes 30 before joining at 31 the vehicle's main exhaust pipe and silencing system 32.

Figure 3:
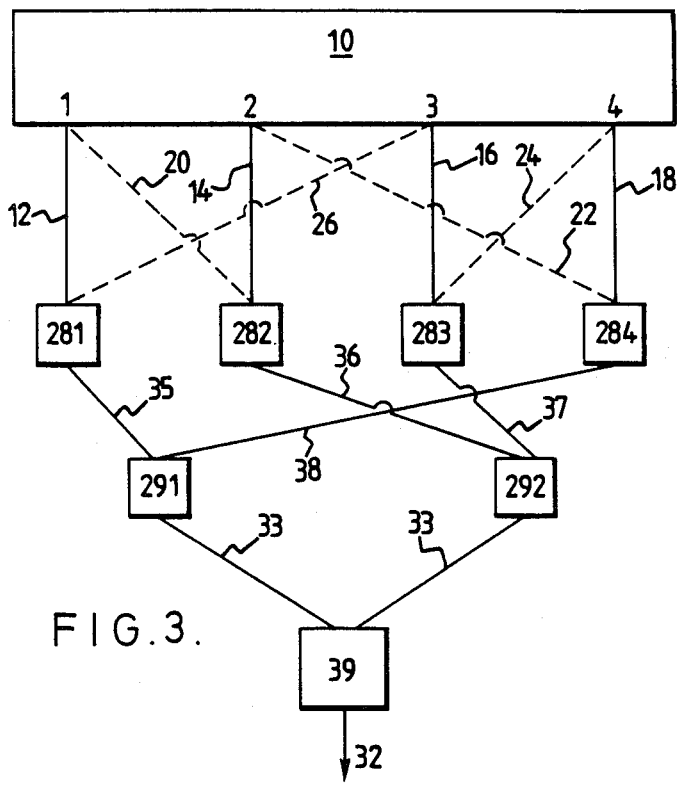
FIG. 3 is a further arrangement of the exhaust system to suit another firing order and a different physical layout of the engine within a vehicle.

FIG. 3 shows diagrammatically another arrangement for an exhaust system following the inventive principles. Again this is for a four-cylinder four-stroke engine but for which the firing order 1-3-4-2-1 is used. In this figure the engine 10 has primary exhaust pipes 12, 14, 16 and 18 connected to the exhaust ports of cylinders 1, 2, 3 and 4 respectively with secondary exhaust pipes, shown dotted 20, 22, 24 and 26 connected respectively to the primary exhaust pipe of the previous cylinder in the firing order. With the selected firing order pipes 12 and 20, 14 and 26, 16 and 22 and 18 and 24 are connected in pairs. The remote ends of the primary and secondary pipes are connected in the respective pairs in junction boxes 281, 282, 283 and 284.

In this example junction boxes 281 and 284 are connected to a further junction box 291 by pipes 35 and 38 whilst junction boxes 282 and 283 are connected by pipes 36 and 37 to the secondary junction box 292. Finally the secondary junction boxes 291 and 292 are joined by pipes 33 to junction box 39 which joins up with the vehicle exhaust pipe and silencing system 32.

As the object of the invention is to use the energy in the discharged exhaust gases to help the discharge from successive cylinders every option is used to reduce the pressure in the secondary exhaust pipes. First the secondary pipes 20 etc. are preferably made slightly larger in diameter than the primary ones 12 etc. and angled to avoid the direct discharge pressure as exhaust is discharged from the exhaust port of the first cylinder. If a deflector (34) is arranged on the upstream side of the oblique junction of the secondary pipe entry near the cylinder head port as shown in FIG. 1 the pressure will be lowered at the entry to the secondary pipe as a result of the velocity and deflection of the primary pipe flow.

The deflector 34 may be an inclined or curved plate welded at the pipe junction.

Figure 4:
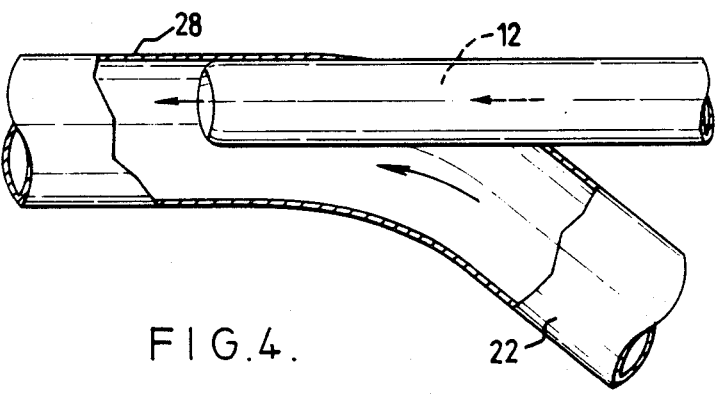
FIG. 4 shows a fragmentary sectional side elevation of one possible form of a junction of pipes as shown in FIG. 2

The far end of the primary pipes may be narrowed as shown at 12 in FIG. 4 where they enter junction boxes 28 in FIG. 2. The velocity resulting from the narrowed primary pipe expands rapidly into the volume of the junction box 28 reducing the resulting static pressure which then prevails at the remote end of the secondary pipe. This reduced pressure is transmitted back through the secondary pipe 23 dropping the pressure at the exhaust port of cylinder No. 2. This then helps rapidly to reduce the pressure in that cylinder when the exhaust valve opens. This could mean that the exhaust valve may be opened slightly later than usual so that slightly more piston work is done during the expansion stroke. At the same time the reduced back pressure prevailing during the exhaust stroke of the engine cycle will diminish the work to be done pushing the exhaust gases out of the cylinder. Both effects will improve the engine power. At the same time the lowered pressures show some improvement in the scavenging of the cylinders which will result in some performance improvement.

In the arrangement shown in FIg. 3 the pipes can be arranged in a similar way to those in junction boxes 28 of FIG. 2. In this FIG. 3 the junction boxes 281, 282, 283 and 284 are identical in principle to those in FIG. 2 (28). The same arrangement is made for the additional junction boxes 291 and 292 which are expected to make small additional reductions in pressure at the engine exhaust ports.

Experiments with an engine fitted with an exhaust system according to the invention indicate that smaller carburettor fuel jets than those fitted to a standard production engine could be used giving a leaner mixture at the same time resulting in a better engine performance.

As full engine test bed facilities were not available it was decided to make comparative tests using a 1.6 liter Ford Kent engine fitted in a Merlyn Formula Ford car using a chassis dynamometer. The Kent engine was fitted with two competition type exhaust systems, one of the orthodox design and the second in accordance with this invention.

The chassis dynamometer tests comprised in each case three tests to measure exhaust emissions with the vehicle "driven" on a cycle in accordance with the ECE15-04 procedure for petrol engined vehicles together with four steady state emission tests at 40, 50, 60 and 90 km/hr road speed equivalent. As required by the ECE15-04 procedure a constant volume sampler was used to collect the exhaust gas samples. Raw exhaust emissions were also recorded.

In setting up the test dynamometer a 2500 16f inertia setting was used together with a road load power setting of 2.4 kw at 50 km/h. This load setting was based on values in the table of road load power versus inertia contained in ECE15-04 regulation.

The emission data are based on the samples taken according to the method laid down by the specification. In addition fuel economy figures have been calculated using a carbon balance technique.

The first series of tests were carried out on the vehicle as supplied having a tubular 4 into 1 silenced exhaust system.

The second series of tests was carried out using the exhaust system modified in accordance with this invention.

Identical carburettor and ignition settings were used for both series of tests.

Good and consistent results were obtained with both the standard and novel exhaust systems in both the European test cycle and the steady state tests.

Results

The results obtained from the Merlyn over the European ECE15-04 test cycles for three tests have been averaged to simplify comparison.

TABLE 1

RESULTS FROM EUROPEAN ECE15-04 TESTS

|  | With Standard Exhaust System | With Exhaust System according to this Invention |
|---|---|---|
| HC g/mile | 17.16 | 18.63 |
| NOx g/mile | 1.86 | 1.684 |
| CO g/mile | 120.79 | 103.47 |
| Fuel Economy m.p.g. | 28.35 | 24.22 |

The results when operating at steady states (speeds) are shown in Table 2.

TABLE 2

COMPARISON OF STEADY STATE TESTS

| Speed km/h | With Standard Exhaust System | | With Exhaust System according to this Invention |
|---|---|---|---|
| 90 | HC g/min | 1.2 | 1.32 |
|  | NOx g/min | 1.6 | 1.9 |
|  | CO g/min | 15.9 | 10.6 |
|  | Fuel L/min | 0.115 | 0.115 |
| 60 | HC g/min | 0.93 | 1.05 |
|  | NOx g/min | 0.403 | 0.462 |
|  | CO g/min | 11.63 | 10.2 |
|  | Fuel L/min | 0.066 | 0.060 |
| 50 | HC g/min | 0.86 | 0.92 |
|  | NOx g/min | 0.128 | 0.172 |
|  | CO g/min | 13.76 | 13.02 |
|  | Fuel L/min | 0.048 | 0.042 |
| 40 | HC g/min | 0.92 | 0.92 |
|  | NOx g/min | 0.056 | 0.056 |
|  | CO g/min | 13.75 | 12.14 |
|  | Fuel L/min | 0.039 | 0.036 |

The results from the European cycle tests show reductions in the emission levels of carbon monoxide (CO) and nitrogen oxides (NOx) together with a 20% improvement in fuel consumption when the exhaust system according to the invention is fitted. Similarly the study state tests show improvements in the carbon monoxide levels and significant improvement in fuel consumption.

Figure 5:
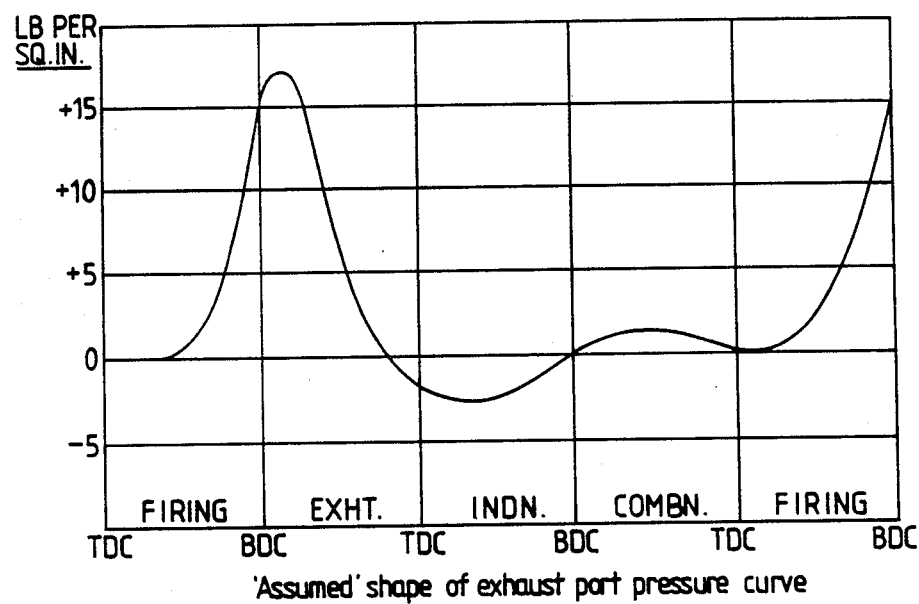
FIG. 5 shows a graphical representation of exhaust valve gas pressure.

The system modified according to this invention, offers improvements in power, economy and exhaust gas emissions over conventional arrangements. It offers a system capable of modification to suit different engines and operating conditions wherein pulses and relative pressure levels in the various branches of the exhaust system provide improved exhaust conditions and better scavenging of the engine cylinders. These improvements, as can be seen from the graph (FIG. 5), result from a high pressure release of gas when the exhaust valve opens. The object of this invention is to utilise this pulse in a direct manner to create a negative pressure that can assist the scavenging of the following cylinder in the firing order.

To achieve this objective the pulse (travelling at a speed in the region of 2,000 feet per second), will take the most direct route available to it. Hence it will travel directly out of the port and down the pipe directly off the port. Further downstream in this pipe, the pulse will travel through the junction constructed as in FIG. 4, and will create a negative pressure in the larger pipe at this junction. This negative pressure is then made available by inter-connection, to assist the evacuation of the balance of exhaust gas from the following cylinder in the firing order.

Once again, the high pressure pulse from this cylinder will travel via the most direct route, and because of the very high velocity will by-pass the negative pressure available at the exhaust port and once again take the most direct route and proceed to do its work in the following junction. The balance of exhaust residue will then be dispersed into the negative pressure provided by the previous cylinder, thereby providing more complete scavenging and reducing the work load required from the engine to evacuate this cylinder. It also provides more complete evacuation and a reduction in contamination of the incoming charge.

The result of this process can be seen in Table 1, in the form of changed exhaust emissions and reduced consumption of fuel to achieve the same work load.

A consistent 10%–15% reduction in fuel consumption has been monitored in a standard 1600 cc standard Ford XR3i engine fitted with an exhaust system according to the invention.

I claim:

1. A method of operating an internal combustion engine, comprising the steps of:
   providing an exhaust system, comprising:
   (i) a cylinder head of the internal combustion engine having a plurality of cylinder means;
   (ii) a respective outlet port for each cylinder means;
   (iii) a primary exhaust pipe means adapted to be connected to a cylinder head of each cylinder means;
   (iv) a secondary exhaust pipe means connected between a primary exhaust pipe means and a primary exhaust pipe means of a second cylinder means so arranged whereby gas exiting the first cylinder means influences gases at the exhaust port of the second cylinder means during the exhaust stroke of the second cylinder means, the secondary exhaust pipe means having a larger diameter than the primary exhaust pipe means and the longitudinal axis of the second exhaust pipe means being inclined with respect to the outlet port; and
   (v) an internal deflector means adjacent the upstream side of the inclined junction of the secondary exhaust pipe means adjacent the outlet port and extending into the primary exhaust pipe means;
   providing junction boxes connecting primary and secondary exhaust and secondary exhaust pipe means to each outlet port;
   connecting the opposite ends of said pipe means to respective different junction boxes; and
   creating negative exhaust gas pressure in the respective secondary pipe means whereby to enhance exhaustion of gases from all the outlet ports.

2. An exhaust system for an internal combustion engine, comprising:
   (i) a cylinder head of the internal combustion engine having a plurality of cylinder means;
   (ii) a respective outlet port for each cylinder means;
   (iii) a primary exhaust pipe means adapted to be connected to a cylinder head of each cylinder means;
   (iv) a secondary exhaust pipe means connected between a primary exhaust pipe means and a primary exhaust pipe means of a second cylinder means so arranged whereby gas exiting the first cylinder means influences gases at the exhaust port of the second cylinder means during the exhaust stroke of the second cylinder means, the secondary exhaust pipe means having a larger diameter than the primary exhaust pipe means and the longitudinal axis of the second exhaust pipe means being inclined with respect to the outlet port; and
   (v) an interval deflector means adjacent the upstream side of the inclined junction of the secondary exhaust pipe means adjacent the outlet port and extending into the primary exhaust pipe means.

3. An exhaust system as defined in claim 2, the ends of the primary and secondary means from any two different outlet ports teminating in a common junction box.

4. An exhaust system as defined in claim 3, the end of the primary pipe means remote from the outlet port and adjacent the junction box being narrower than the remainder of that pipe means.

5. An exhaust system as defined in claim 3, wherein there is a plurality of sets of junction boxes and a common sole downstream junction box.

6. An internal combustion engine comprising an exhaust system as defined in claim 2.

* * * * *